US012492789B1

(12) United States Patent
Feng

(10) Patent No.: US 12,492,789 B1
(45) Date of Patent: Dec. 9, 2025

(54) CHARGING EMERGENCY LIGHT BULB

(71) Applicant: Zhiguo Feng, Zhongshan (CN)

(72) Inventor: Zhiguo Feng, Zhongshan (CN)

( * ) Notice: Subject to any disclaimer, the term of this patent is extended or adjusted under 35 U.S.C. 154(b) by 0 days.

(21) Appl. No.: 19/183,061

(22) Filed: Apr. 18, 2025

(51) Int. Cl.

| | |
|---|---|
| ***F21S 9/02*** | (2006.01) |
| ***F21V 3/02*** | (2006.01) |
| ***F21V 15/01*** | (2006.01) |
| ***F21V 23/00*** | (2015.01) |
| ***F21V 23/02*** | (2006.01) |
| ***F21V 23/06*** | (2006.01) |
| ***F21Y 115/10*** | (2016.01) |

(52) U.S. Cl.
CPC ................ *F21S 9/022* (2013.01); *F21V 3/02* (2013.01); *F21V 15/01* (2013.01); *F21V 23/005* (2013.01); *F21V 23/02* (2013.01); *F21V 23/06* (2013.01); *F21Y 2115/10* (2016.08)

(58) Field of Classification Search
CPC .. F21S 9/022; F21V 3/02; F21V 15/01; F21V 23/005; F21V 23/02; F21V 23/06; F21Y 2115/10
See application file for complete search history.

(56) References Cited

U.S. PATENT DOCUMENTS 6,948,829 B2 * 9/2005 Verdes ...................... F21V 3/00 315/71
8,083,383 B2 * 12/2011 Chen ..................... F21V 29/717 362/373
8,444,299 B2 * 5/2013 Chou ...................... F21K 9/232 362/651
8,905,600 B2 * 12/2014 Sun ....................... F21V 29/773 362/373
9,784,417 B1 * 10/2017 Springer ................... F21K 9/60
2010/0165632 A1 * 7/2010 Liang ...................... F21K 9/232 362/373
2011/0109216 A1 * 5/2011 Kang ...................... F21V 29/74 313/45
2012/0188745 A1 * 7/2012 Yoneda ................. F21V 29/773 362/373
2014/0354155 A1 * 12/2014 Clifford .................... F21K 9/23 362/373
2018/0087766 A1 * 3/2018 Zhang ..................... F21V 17/12

FOREIGN PATENT DOCUMENTS

CN 214948292 U * 11/2021
CN 219510635 U * 8/2023

* cited by examiner

*Primary Examiner* — Tsion Tumebo
(74) *Attorney, Agent, or Firm* — JEEN IP LAW, LLC

(57) ABSTRACT

A charging emergency light bulb is provided, which includes a lamp head, a lamp housing, a lampshade, and an electrical component. The lamp head is fixedly provided at one end of the lamp housing, and the lampshade is fixedly provided at the other end of the lamp housing; the electrical components include a PCB board and a battery. The PCB board is fixedly provided in the lamp housing and electrically connected to the lamp head. The PCB board is fixed on one side of the lampshade and electrically connected to a plurality of LED light-emitting elements. The battery is fixedly provided inside the lamp housing and electrically connected to the PCB board. When powered normally, electrical energy is input from the lamp head to the PCB board. This allows emergency light bulbs to function as common lighting bulbs during normal power on and as emergency light bulbs during power off.

5 Claims, 8 Drawing Sheets

CHARGING EMERGENCY LIGHT BULB

TECHNICAL FIELD

The present disclosure relates to the field of LED bulb technologies, and in particular, to a charging emergency light bulb.

BACKGROUND

Since the emergence of high brightness blue LED in 1994, combined with fluorescent powder technology, the commercialization of white LED has been achieved, rendering the entry of the lighting industry into the era of high efficiency and energy conservation. With the intensification of the global energy crisis and the promotion of environmental policies, LED bulbs have rapidly replaced traditional incandescent and fluorescent lamps with their significant advantages. With the popularity of LED bulbs, various requirements for LED bulbs have emerged, such as emergency bulbs that can provide emergency lighting in case of power outages.

Existing emergency light bulbs generally include a lamp housing and a lampshade. The lampshade is fixed at one end of the lamp housing, and an interior of the lamp housing is fixed with a PCB board and a battery. The PCB board is connected to the battery, and the PCB board is fixed and electrically connected with LED light-emitting elements and an on-off switch. When a power outage occurs, the on-off switch is turned on, so that the battery supplies power to the PCB board, and then the LED light-emitting elements emit light, thus completing the emergency lighting of the emergency light bulb.

Regarding the relevant technologies mentioned above, when powered on normally, emergency light bulbs are not easy to charge the battery and emit light normally, rendering it difficult for emergency light bulbs to be used as common lighting bulbs during normal power on, which results in limited usage scenarios for emergency light bulbs.

SUMMARY

In order to enable emergency light bulbs to function as common lighting bulbs during normal power on and as emergency light bulbs during power off, the present application provides a rechargeable emergency light bulb.

The charging emergency light bulb provided in this application adopts the following technical solution.

A charging emergency light bulb, including a lamp head, a lamp housing, a lampshade, and an electrical component; where the lamp head is fixedly provided at one end of the lamp housing, and the lampshade is fixedly provided at the other end of the lamp housing;

the electrical component includes a PCB board and a battery; the PCB board is fixedly provided in the lamp housing and electrically connected to the lamp head; the PCB board is fixed on one side facing the lampshade and electrically connected to a plurality of LED light-emitting elements; the battery is fixedly provided inside the lamp housing and electrically connected to the PCB board.

By adopting the above technical solution, during normal power on, electrical energy is input from the lamp head to the PCB board. A part of the electrical energy flows to the battery and charges the battery, while the other part is emitted through various LED light-emitting elements. When a power outage occurs, a power supply mode of the PCB board automatically switches to battery power supply, thereby enabling the battery to supply power to various LED light-emitting elements and achieving emergency lighting function. This improves a problem of emergency light bulbs being difficult to charge the battery while providing normal lighting during normal power on, rendering it difficult for emergency light bulbs to be used as common lighting bulbs during normal power on, which results in limited use scenarios for emergency light bulbs.

In some embodiments of the present disclosure, an outer peripheral surface of the lamp housing is provided with a plurality of elliptical grooves, and the elliptical grooves are uniformly distributed around an axis of the lamp housing in a circumferential direction.

In some embodiments of the present disclosure, there are nine elliptical grooves.

In some embodiments of the present disclosure, an outer peripheral surface of the lamp housing is provided with a first ring groove, a second ring groove, and a third ring groove; the first ring groove, the second ring groove, and the third ring groove are sequentially arranged from one end near the lamp head to one end near the lampshade.

In some embodiments of the present disclosure, a diameter of the lamp housing is gradually increased from one end near the lamp head to one end near the lampshade.

In summary, this application includes at least one beneficial technical effect as follows.

When powered normally, electrical energy is input from the lamp head to the PCB board. A part of the electrical energy flows to the battery and charges the battery, and the other part is emitted through various LED light-emitting elements. When a power outage occurs, the power supply mode of the PCB board automatically switches to battery power, allowing the battery to supply power to each LED light-emitting element and achieve emergency lighting function. This improves the problem of emergency light bulbs being difficult to charge the battery and providing normal lighting when powered on normally, rendering it difficult for emergency light bulbs to be used as common lighting bulbs when powered on normally, which results in limited use scenarios for emergency light bulbs.

Numeral reference: 1—lamp head; 11—connecting thread; 2—lamp housing; 21—elliptical groove; 22—first ring groove; 23—second ring groove; 24—third ring groove; 3—lampshade; 4—electrical component; 41—PCB board; 411—LED light-emitting element; 4111—first light bead string; 4112—charging light bead; 4113—second light bead string; 42—battery.

DESCRIPTION OF EMBODIMENTS

Figure 1:
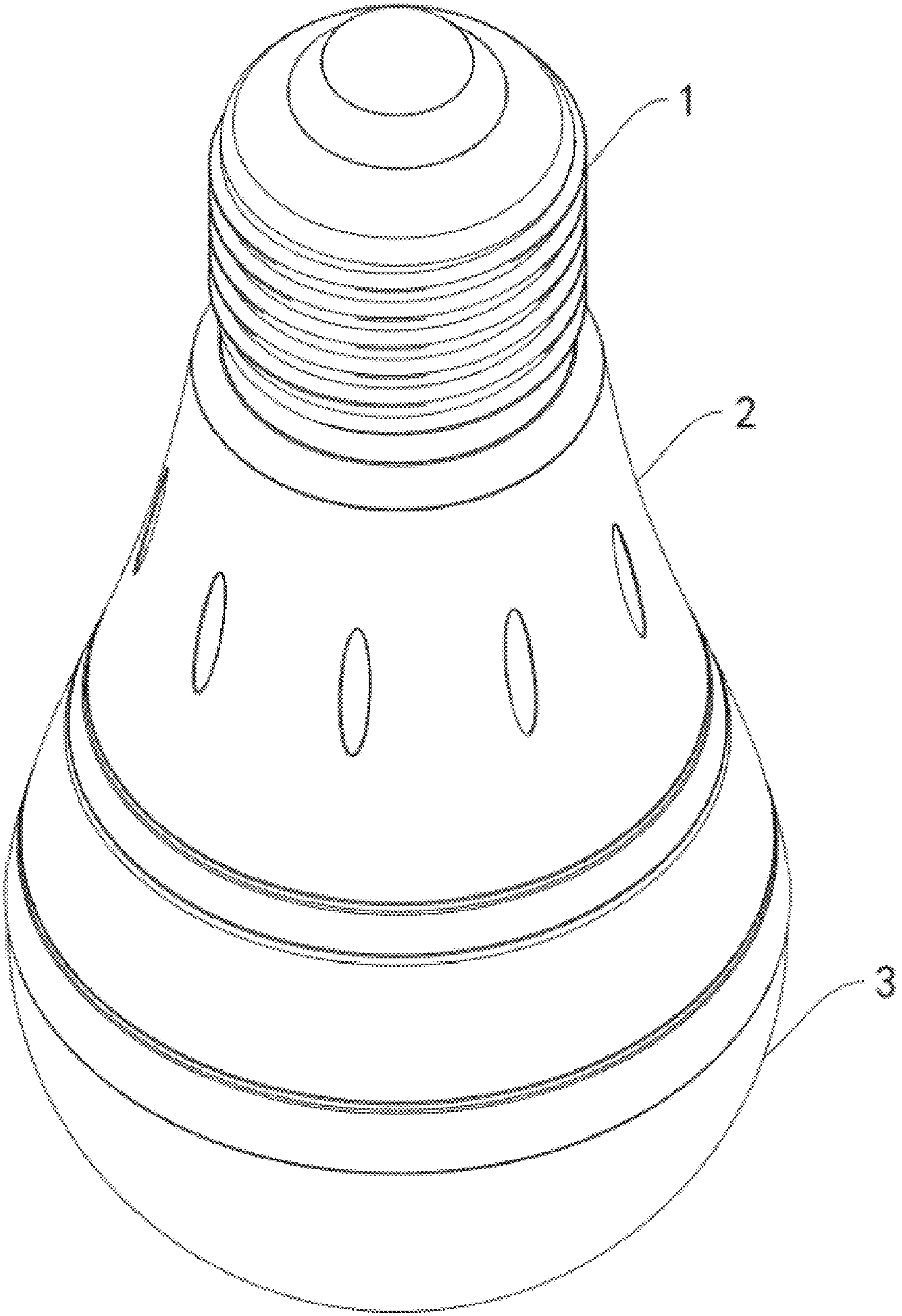
FIG. 1 is a schematic diagram of an overall structure of an embodiment of the present application.
Figure 2:
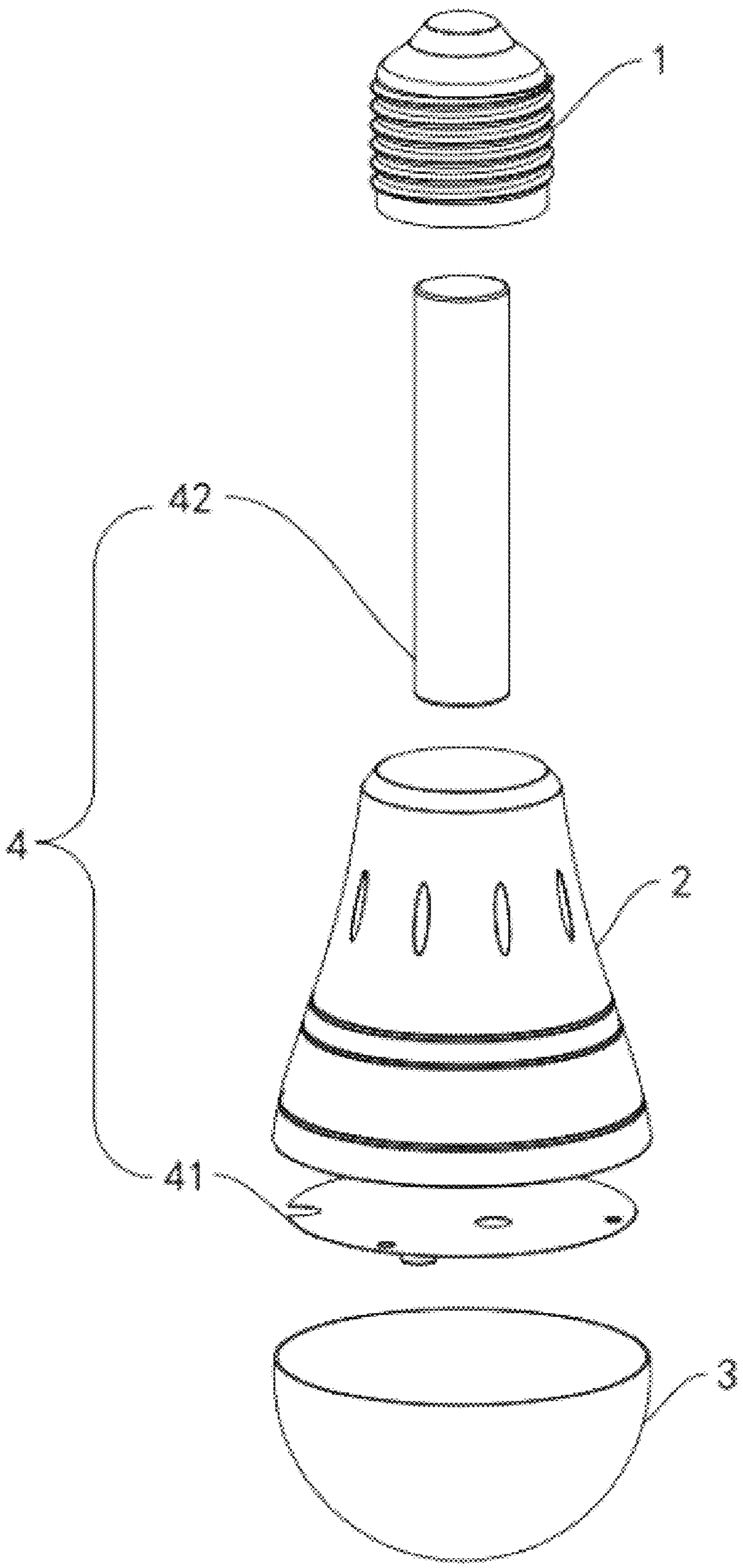
FIG. 2 is an exploded view of the overall structure of an embodiment of the present application.
Figure 3:
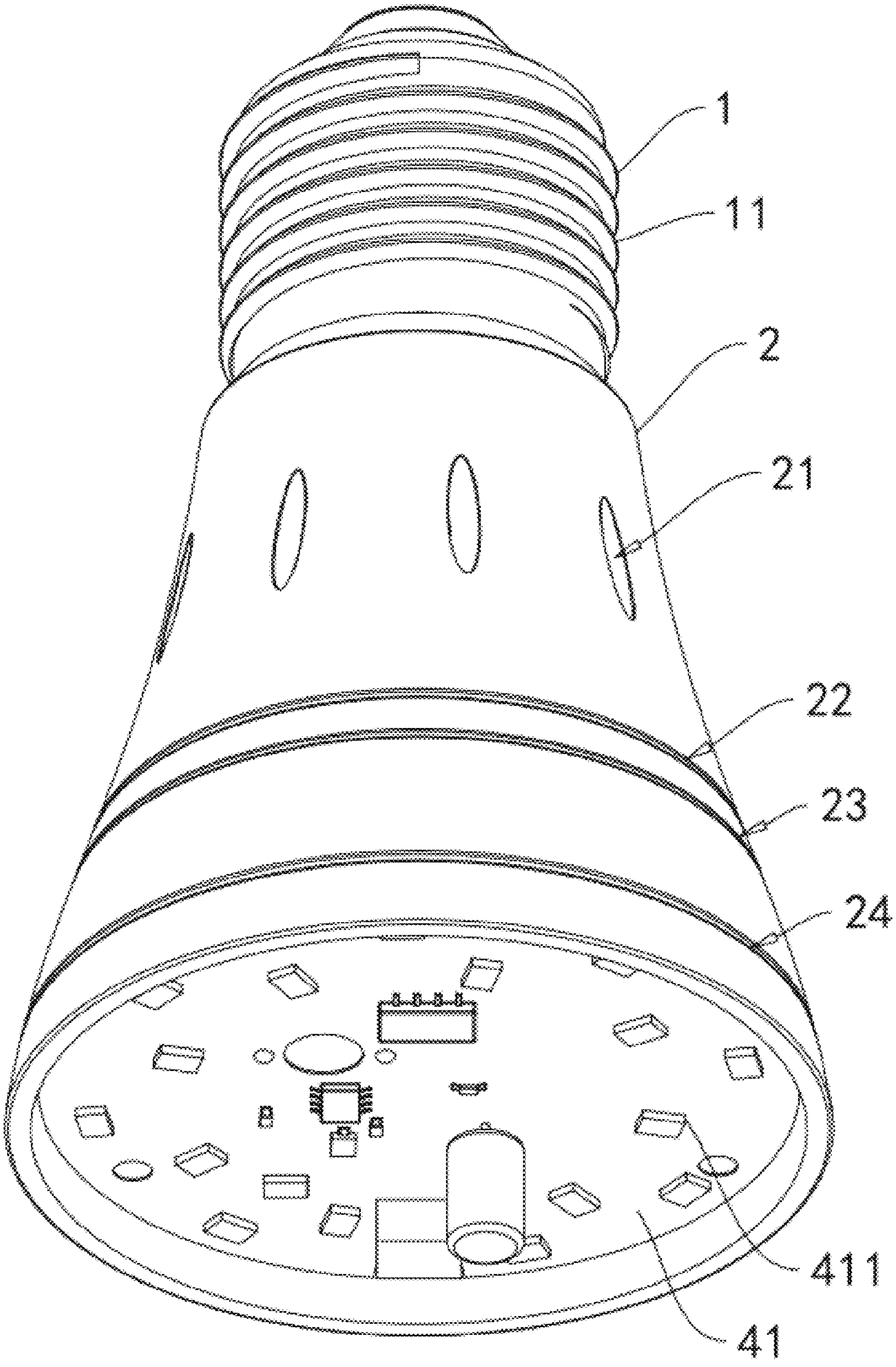
FIG. 3 is a schematic structural diagram of a lamp housing according to an embodiment of the present application.
Figure 4:
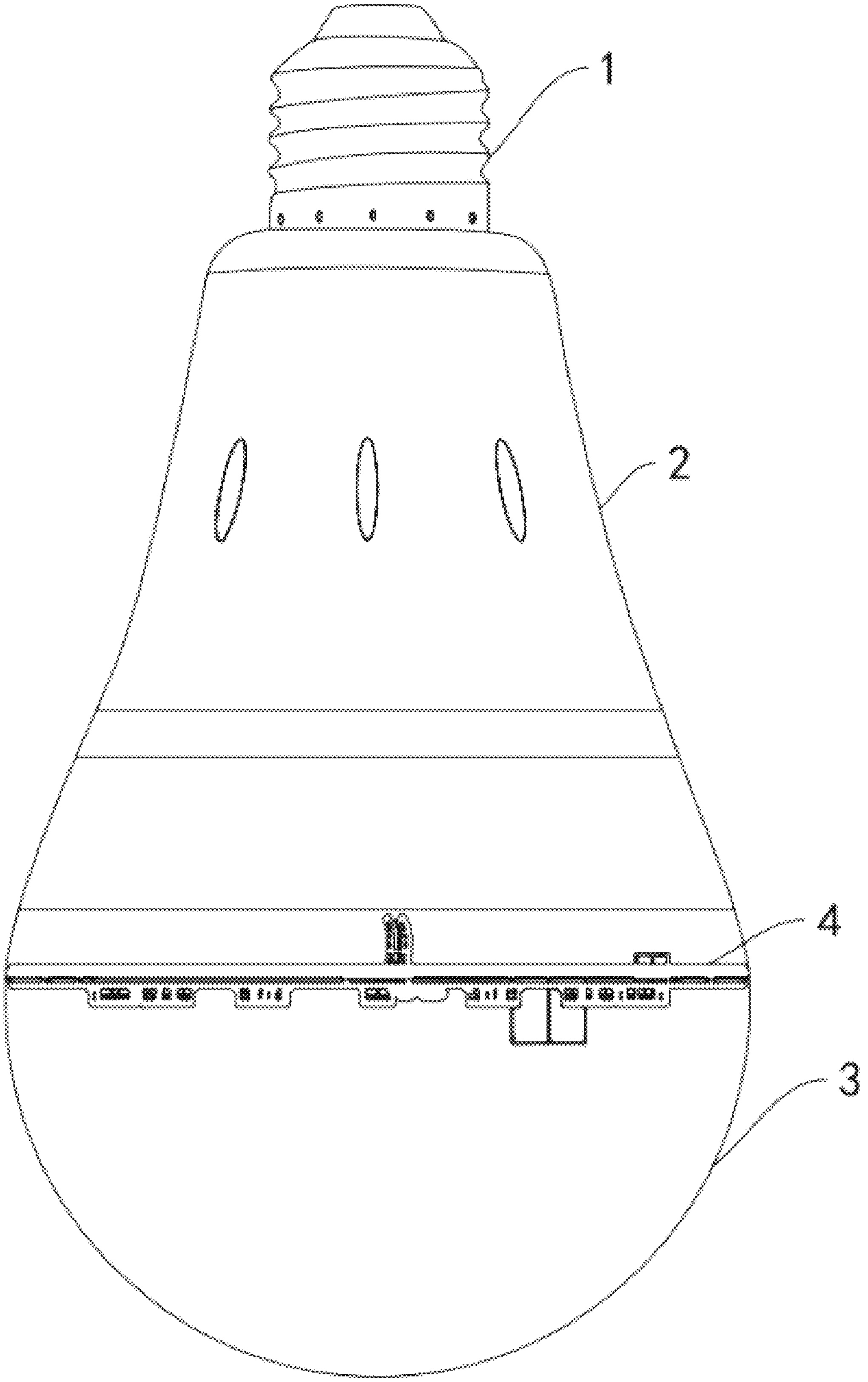
FIG. 4 is a first schematic diagram of an internal structure of an embodiment of the present application.
Figure 5:
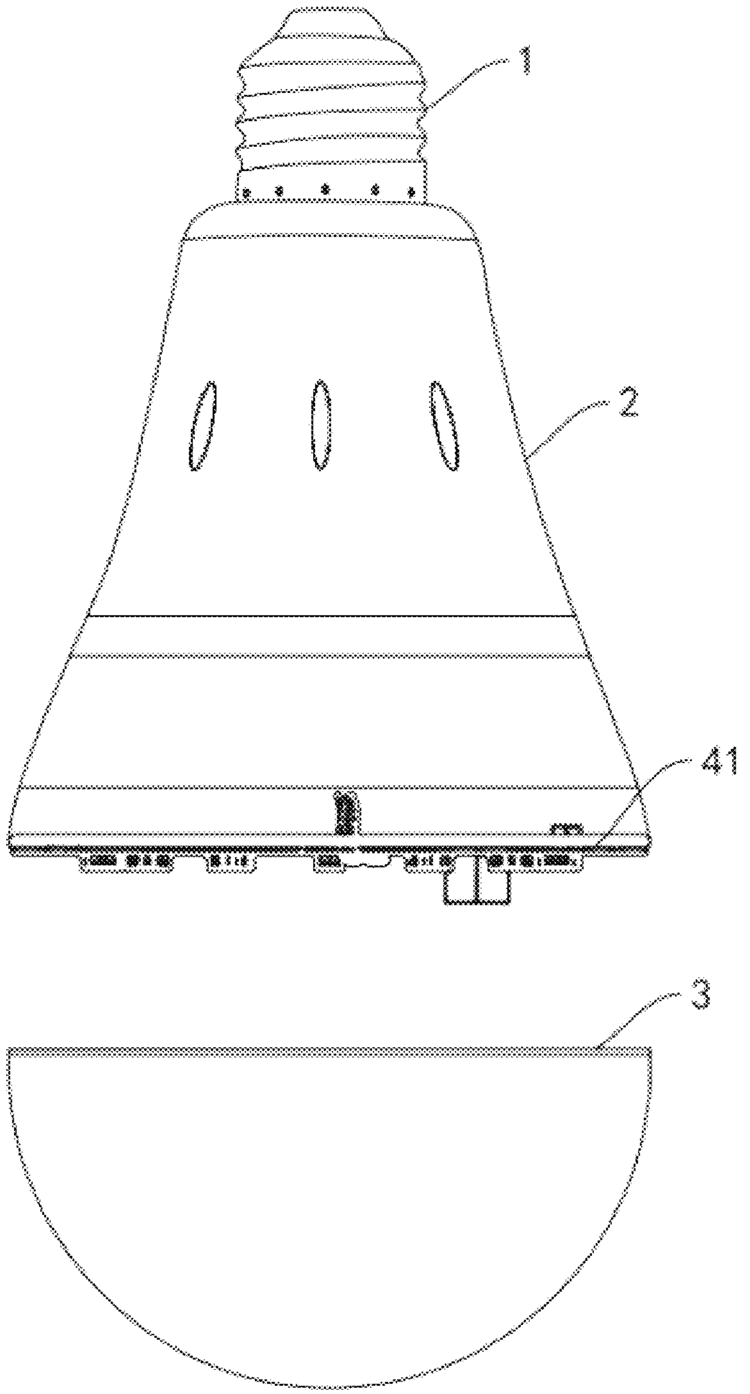
FIG. 5 is a schematic diagram of an internal structure of a second embodiment of the present application.
Figure 6:
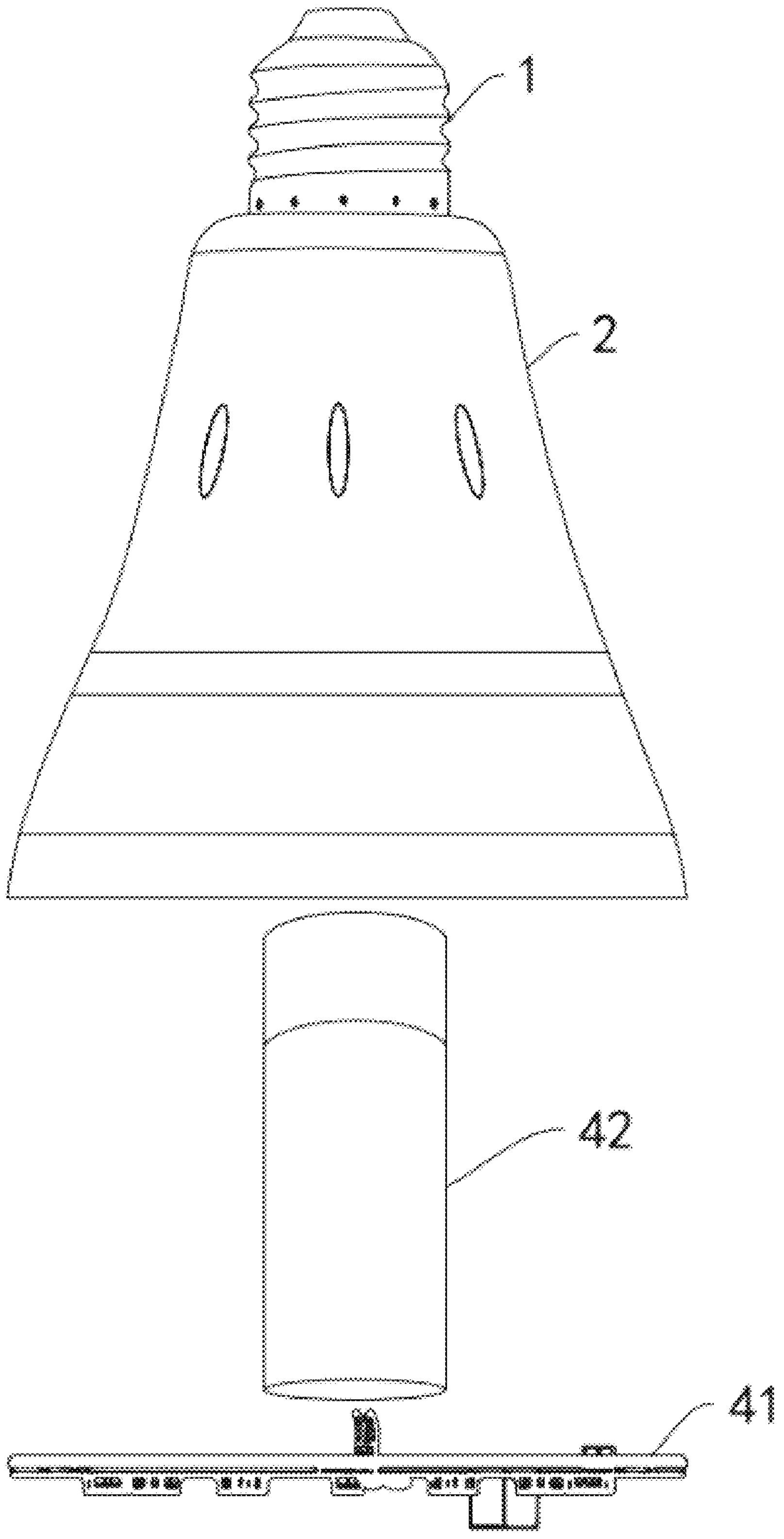
FIG. 6 is a schematic diagram of an internal structure of a third embodiment of the present application.
Figure 7:
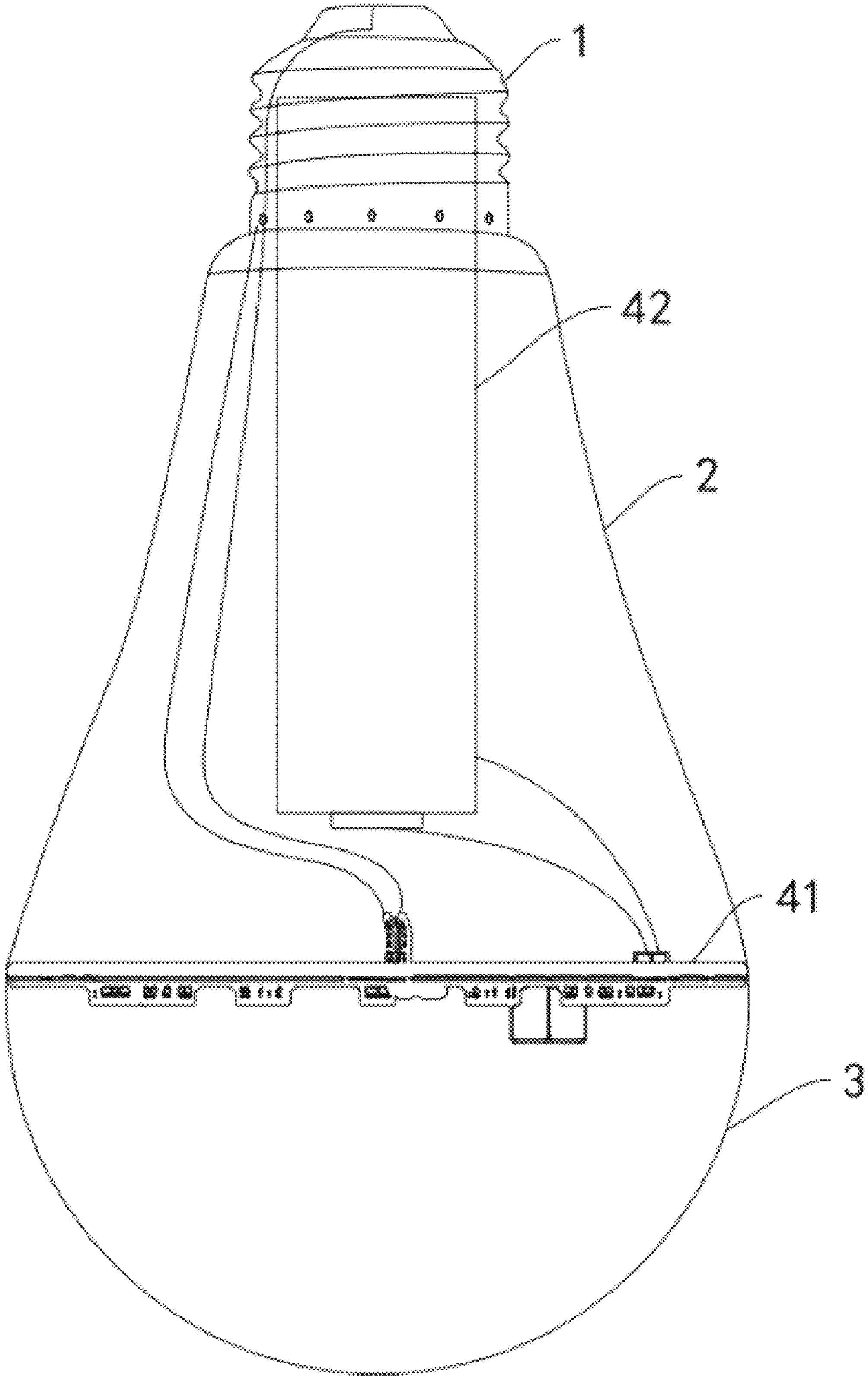
FIG. 7 is a schematic diagram of a circuit connection in an embodiment of the present application.

Further detailed explanation of the present application will be provided in combination with FIGS. 1-3.

An embodiment of the present application discloses a charging emergency light bulb. Referring to FIGS. 1 and 2, the charging emergency light bulb includes a lamp head 1, a lamp housing 2, a lampshade 3, and an electrical component 4. The lamp head 1 is fixedly provided at one end of the lamp housing 2, the lampshade 3 is fixedly provided at the other end of the lamp housing 2, and the electrical component 4 is provided in the lamp housing 2.

Referring to FIGS. 1 and 2, in the embodiment of the present application, the material of the lamp head 1 is selected as conductive metal, an outer peripheral surface of the lamp head 1 is provided with a connecting thread 11.

Referring to FIGS. 2 and 3, the lamp housing 2 is a circular cone with a gradually increasing diameter from one end near the lamp head 1 to one end near the lampshade 3. An outer peripheral surface of the lamp housing 2 is provided with nine elliptical grooves 21, and the elliptical grooves 21 are evenly distributed around an axis of the lamp housing 2 in a circumferential direction.

Referring to FIGS. 2 and 3, an outer peripheral surface of the lamp housing 2 is provided with a first ring groove 22, a second ring groove 23, and a third ring groove 24. The first ring groove 22, the second ring groove 23, and the third ring groove 24 are provided in sequence from one end near the lamp head 1 to one end near the lampshade 3. A diameter of the first ring groove 22 is smaller than that of the second ring groove 23, and the diameter of the second ring groove 23 is smaller than that of the third ring groove 24. Each elliptical groove 21 is located between the first ring groove 22 and the lamp head 1.

Referring to FIGS. 2 and 3, in an implementation mode, the material of the lampshade 3 is selected as a transparent material, and the lampshade 3 is a hollow hemisphere shape.

Referring to FIGS. 2 and 3, the electrical component 4 includes a PCB board 41 and a battery 42. The PCB board 41 is fixedly provided in the lamp housing 2 and electrically connected to the lamp head 1. The PCB board 41 is fixed on one side facing the lampshade 3 and electrically connected to a plurality of LED light-emitting elements 411. The battery 42 is fixedly provided in the lamp housing 2 and electrically connected to the PCB board 41.

The implementation principle of the charging emergency light bulb in this application is as follows: during normal power on, electrical energy is input from the lamp head 1 to the PCB board 41, and a part of electrical energy flows to the battery 42 so as to charge the battery 42, and the other part of the electrical energy is emitted through each LED light-emitting element 411. When a power outage occurs, a power supply mode of the PCB board 41 automatically switches to the battery 42, so that the battery 42 supplies power to each LED light-emitting element 411, thereby achieving emergency lighting function and improving the problem that emergency light bulbs are difficult to charge the battery 42 while emitting normal light during normal power on. This makes it difficult for emergency light bulbs to be used as common lighting bulbs during normal power on, which results in limited use scenarios for emergency light bulbs.

A driving circuit for driving the LED light-emitting elements 411 in this application will be further described below.

Figure 8:
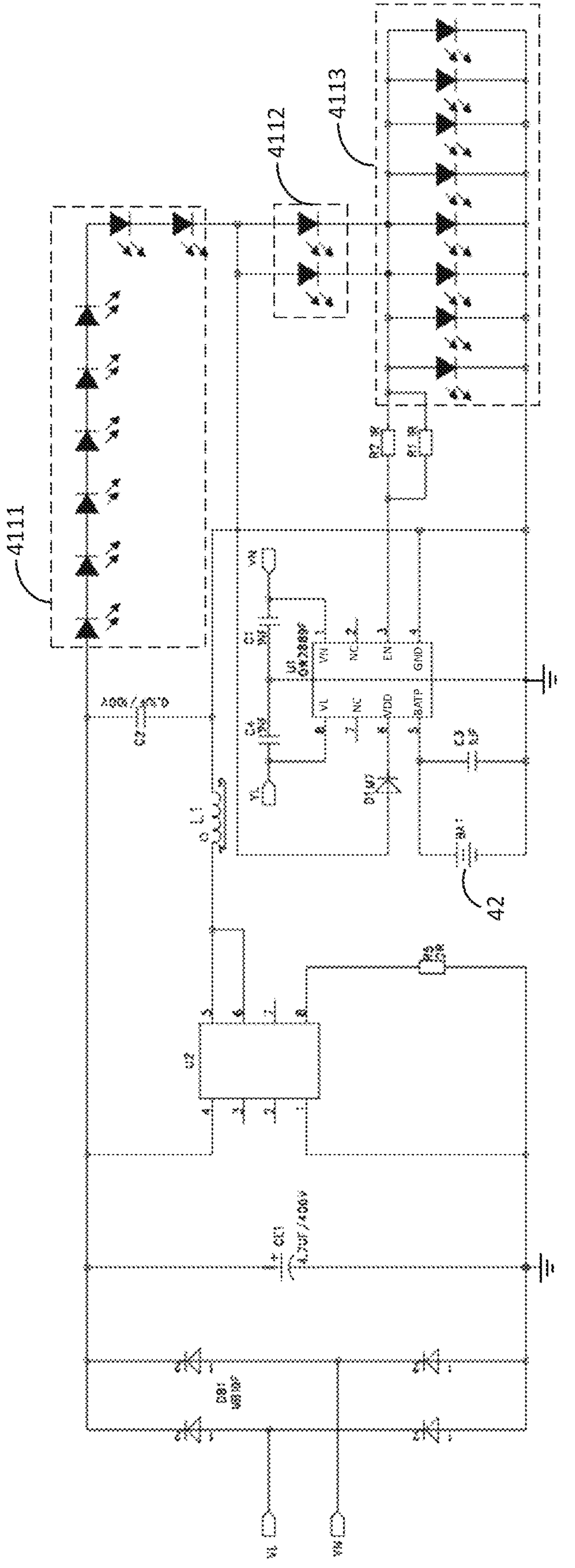
FIG. 8 is a circuit diagram of a driving circuit of an embodiment of the present application.

As shown in FIG. 8, in this embodiment, the PCB board 41 has a driving circuit, and the driving circuit includes a first rectifier DB1, a first electrolytic capacitor CE1, a second high-voltage chip U2, a fifth sampling resistor R5, a first inductor L1, a second capacitor C2, a first control chip U1, a first diode D1, a first capacitor C1, a third capacitor C3, a fourth capacitor C4, a first resistor R1, and a second resistor R2.

The LED light-emitting elements 411 includes a first light bead string 4111 that are connected in series, a charging light bead 4112, and a second light bead string 4113 that are connected in parallel. The first light bead string 4111 includes eight 6V high-voltage LED beads, the charging light bead 4112 includes two parallel 3V charging LED beads, and the second light bead string 4113 includes eight 3V emergency LED beads.

Two input terminals of the first rectifier DB1 are respectively connected to a positive pole VL and a negative pole VN of an AC power source, such as mains power. A positive pole of the first electrolytic capacitor CE1, a fourth pin of the second high-voltage chip U2, one end of the second capacitor C2, a positive pole of the first light bead string 4111 are all connected to a first output terminal of the first rectifier DB1. A second output terminal of the first rectifier DB1, a negative pole of the first electrolytic capacitor CE1, and a first pin of the second high-voltage chip U2 are all grounded. An eighth pin of the second high-voltage chip U2 is grounded through the fifth sampling resistor R5. A fifth pin and a sixth pin of the second high-voltage chip U2 are connected to one end of the first inductor L1, the other end of the first inductor L1, the other end of the second capacitor C2, and a fourth pin of the first control chip U1 are all grounded. A negative pole of the first light bead string 4111 is connected to a sixth pin of the first control chip U1 through the first diode D1. An eighth pin of the first control chip U1 and one end of the fourth capacitor C4 are both connected to a positive pole VL of AC. A first pin of the first control chip U1 and one end of the first capacitor C1 are all connected to a negative pole VN of the AC power supply, the other end of the fourth capacitor C4 and the other end of the first capacitor C1 are both grounded. A fifth pin of the first control chip U1 is connected to a positive pole of the battery 42 and one end of the third capacitor C3, and the other end of the third capacitor C3 is grounded to a negative pole of the battery 42. A third pin of the first control chip U1 is connected to a positive pole of the second light bead string 4113 through the second resistor R2, and a negative pole of the second light bead string 4113 is grounded. A positive pole of the charging light bead 4112 is connected to a negative pole of the first light bead string, and a negative pole of the charging light bead 4112 is connected to a positive pole of the second light bead string. The first resistor R1 is parallel connected to two ends of the second resistor R2.

In an implementation mode, the first control chip U1 has a model of QW2889F chip, which is an emergency detection control chip.

An eighth pin and a first pin of the QW2889F chip are connected to the AC power supply, which is configured to achieve level conversion of an EN pin (third pin) based on an impedance state between the positive pole VL and negative pole VN of the AC power supply. When an AC voltage is input between the positive pole VL and the negative pole VN, or when there is no AC voltage, but an equivalent impedance of a detection circuit is greater than a threshold resistance, all switch tubes inside the QW2889F chip are turned off, and the EN pin output is in a high resistance state. Only when the AC voltage is zero and the equivalent impedance between the positive pole VL and negative pole VN is less than the threshold resistance, the EN pin outputs a high level (i.e. a voltage of the battery 42). Therefore, when there is an AC voltage input from the AC power supply, the EN pin of the QW2889F chip is in a high impedance state and does not output voltage. The AC power supply provides a working voltage required for the LED light-emitting elements 411, thereby driving the first light bead string 4111, the charging light bead 4112, and the second light bead string 4113 to emit light, thereby achieving the lighting function. At the same time, the AC power supply can also charge the battery 42 through the QW2889F chip, and the charging light bead 4112 is configured to indicate the charging of the battery 42.

Furthermore, the QW2889F chip supports 85-265Vac full voltage input, and its EN pin (i.e. third pin) supports series current limiting resistors to directly drive a single string of LED beads. It also supports external boost circuits to drive multiple strings of LED beads. In this embodiment of the present application, as shown in FIG. 8, power can be supplied to the beads through the EN pin. In an implementation mode, when the QW2889F chip detects that the AC voltage is zero and the equivalent impedance between the positive pole VL and the negative pole VN is less than the threshold resistance, the battery 42 outputs the working voltage through the EN pin to drive the second light bead string 4113 to emit light. Therefore, in the event of a power outage, eight emergency beads can be driven to emit light through the EN pin. Thus, achieving emergency lighting function. Therefore, the driving circuit of this application can be compatible with both general lighting and emergency lighting functions, and can work normally under different power supply conditions, it is suitable for various scenarios.

The QW2889F chip further integrates a lithium battery protection module internally, which supports recharging of 0V batteries and has overcharge protection and over discharge protection functions. When the voltage of the battery 42 is between 0 and 2V, the charging current will pass through an internal resistor equivalent to 100 ohms to limit the current charging of the battery 42. When the voltage of battery 42 is greater than 2V, the internal charging tube is opened, and the charging current is determined by an external charging source.

The QW2889F chip further has function of automatic recognition of neutral wire mixed connection. When multiple emergency lighting fixtures are used in parallel, the positive pole VL (live wire) and negative pole VN (neutral wire) of the AC power supply can be freely connected to either end. It only needs to quickly switch once within 1 second of the first AC power supply. Afterwards, all light beads in the same line will automatically recognize and remember the neutral wire status, thereby completing the mixed connection alignment mode. This mode will automatically reset when the voltage of the battery 42 is below 2V. As a result, through the automatic recognition function of mixed neutral and live wires, multiple lamps provided in parallel do does not need to strictly distinguish between neutral and live wires, reducing installation difficulty and error rates.

The QW2889F chip further integrates an emergency dimming module internally. In an emergency mode (i.e. no AC voltage input), the switch is turned on and off once within 5 seconds, which will cause the QW2889F chip to enter a dimming mode. The brightness is 100%-50%-25%, and it will cycle in sequence. That is, if the switch is switched every 5 seconds, the brightness will cycle by 100%-50%-25%, which can meet different brightness requirements and improve the user experience. If the switch switching time is greater than 5 seconds, the brightness will be 100% every time when it is turned on. At the same time, after connecting the AC voltage once at any brightness, the brightness will default to 100% when entering emergency mode again.

The above are preferred embodiments of the present application and do not limit the protection scope of the present application. Therefore, any equivalent changes made according to the structure, shape, and principle of the present application should be included in the protection scope of the present application.

What is claimed is:

1. A charging emergency light bulb, comprising a lamp head, a lamp housing, a lampshade, and an electrical component, wherein the lamp head is fixedly provided at one end of the lamp housing, and the lampshade is fixedly provided at the other end of the lamp housing;

the electrical component comprises a PCB board and a battery;

the PCB board is fixedly provided in the lamp housing and electrically connected to the lamp head;

the PCB board is fixed on one side facing the lampshade and electrically connected to a plurality of LED light-emitting elements;

the battery is fixedly provided inside the lamp housing and electrically connected to the PCB board;

wherein the PCB board has a driving circuit, and the driving circuit comprises a first rectifier, a first electrolytic capacitor, a second high-voltage chip, a fifth sampling resistor, a first inductor, a second capacitor, a first control chip, a first diode, a first capacitor, a third capacitor, a fourth capacitor, a first resistor, and a second resistor;

the LED light-emitting elements comprise a first light bead string connected in series, a charging light bead, and a second light bead string connected in parallel;

two input terminals of the first rectifier are respectively connected to a positive pole and a negative pole of an AC power supply;

a positive pole of the first electrolytic capacitor, a fourth pin of the second high-voltage chip, one end of the second capacitor, a positive pole of the first light bead string are all connected to a first output terminal of the first rectifier;

a second output terminal of the first rectifier, a negative pole of the first electrolytic capacitor, and a first pin of the second high-voltage chip are all grounded;

an eighth pin of the second high-voltage chip is grounded through the fifth sampling resistor;

fifth and sixth pins of the second high-voltage chip are connected to one end of the first inductor;

the other end of the first inductor, the other end of the second capacitor, and a fourth pin of the first control chip are all grounded;

a negative pole of the first light bead string is connected to a sixth pin of the first control chip through the first diode, an eighth pin of the first control chip and one end of the fourth capacitor are both connected to a positive pole of the AC power supply, a first pin of the first control chip and one end of the first capacitor are both connected to a negative pole of the AC power supply, the other end of the fourth capacitor and the other end of the first capacitor are both grounded, a fifth pin of the first control chip is connected to a positive pole of the battery and one end of the third capacitor, the other end of the third capacitor and a negative pole of the battery are both grounded, a third pin of the first control chip is connected to a positive pole of the second light bead string through the second resistor, a negative pole of the second light bead string is grounded, a positive pole of the charging light bead is connected to a negative pole of the first light bead string, a negative pole of the charging light bead is connected to a positive pole of the second light bead string, and the first resistor is parallel connected to two ends of the second resistor.

2. The charging emergency light bulb according to claim 1, wherein an outer surface of the lamp housing is provided with a plurality of elliptical grooves, and the elliptical grooves are uniformly distributed around an axis of the lamp housing in a circumferential direction.

3. The charging emergency light bulb according to claim 2, wherein there are nine elliptical grooves.

4. The charging emergency light bulb according to claim 1, wherein an outer peripheral surface of the lamp housing is provided with a first ring groove, a second ring groove, and a third ring groove;

the first ring groove, the second ring groove, and the third ring groove are sequentially arranged from one end near the lamp head to one end near the lampshade.

5. The charging emergency light bulb according to claim 1, wherein a diameter of the lamp housing is gradually increased from one end near the lamp head to one end near the lampshade.

* * * * *